(12) United States Patent
Sasaki (10) Patent No.: US 10,442,250 B2
(45) Date of Patent: Oct. 15, 2019

(54) PNEUMATIC TIRE (71) Applicant: SUMITOMO RUBBER INDUSTRIES LTD., Kobe-shi (JP)

(72) Inventor: Tatsuya Sasaki, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 840 days.

(21) Appl. No.: 14/940,881

(22) Filed: Nov. 13, 2015

(65) Prior Publication Data

US 2016/0152092 A1 Jun. 2, 2016

(30) Foreign Application Priority Data

Nov. 27, 2014 (JP) .................................. 2014-240400

(51) Int. Cl.
*B60C 11/03* (2006.01)
(52) U.S. Cl.
CPC ...... *B60C 11/0332* (2013.01); *B60C 11/0302* (2013.01); *B60C 11/0304* (2013.01); *B60C 2011/0341* (2013.01); *B60C 2011/0367* (2013.01); *B60C 2011/0381* (2013.01)
(58) Field of Classification Search
CPC ......... B60C 11/0304; B60C 2011/0381; B60C 2011/0383
See application file for complete search history.

(56) References Cited

U.S. PATENT DOCUMENTS

| 4,387,754 | A | * | 6/1983 | Mirtain | ............... | B60C 11/0306 |
| | | | | | | 152/209.1 |
| 2013/0092304 | A1 | * | 4/2013 | Murata | ............... | B60C 11/0306 |
| | | | | | | 152/209.18 |
| 2014/0283966 | A1 | * | 9/2014 | Horiguchi | ............. | B60C 11/005 |
| | | | | | | 152/209.18 |
| 2016/0121658 | A1 | * | 5/2016 | Skurich | ............... | B60C 11/0327 |
| | | | | | | 152/209.18 |

FOREIGN PATENT DOCUMENTS

JP 63-159110 A * 7/1988
JP 2013-151236 A 8/2013

OTHER PUBLICATIONS

Machine translation for Japan 63-159110 (Year: 2018).*

* cited by examiner

*Primary Examiner* — Steven D Maki
(74) *Attorney, Agent, or Firm* — Oblon, McClelland, Maier & Neustadt, L.L.P.

(57) ABSTRACT

A pneumatic tire includes a tread which has designated direction to be mounted on a vehicle and has an inner tread edge on vehicle inner side and an outer tread edge on vehicle outer side when mounted on a vehicle. The tread has main grooves, and lateral grooves extending in direction crossing the main grooves. The lateral grooves include inner and outer middle-lateral grooves. The inner middle-lateral grooves include first and second inner middle-inclined grooves inclining in directions opposite with respect to each other and formed alternately with the first inner middle-inclined grooves. The outer middle-lateral grooves include first and second outer middle-inclined grooves inclining in directions opposite with respect to each other and formed alternately with the first outer middle-inclined grooves. The total number of the first and second outer middle-inclined grooves is set to be less than the total number of the first and second inner middle-inclined grooves.

20 Claims, 5 Drawing Sheets

PNEUMATIC TIRE

CROSS-REFERENCE TO RELATED APPLICATIONS

The present application is based upon and claims the benefit of priority to Japanese Patent Application No. 2014-240400, filed Nov. 27, 2014, the entire contents of which are incorporated herein by reference.

BACKGROUND OF THE INVENTION

Field of the Invention

The present invention relates to a pneumatic tire that exhibits well-balanced enhancement of steering stability and wet performance.

Description of Background Art

JP2013-151236A, for example, describes a pneumatic tire with a designated direction to be mounted on a four-wheel vehicle (hereinafter, may also be referred to as simply a "vehicle"). The entire contents of this publication are incorporated herein by reference.

SUMMARY OF THE INVENTION

According to one aspect of the present invention, a pneumatic tire includes a tread which has a designated direction to be mounted on a vehicle and has an inner tread edge positioned to be on a vehicle inner side and an outer tread edge to be positioned on a vehicle outer side when mounted on a vehicle. The tread has main grooves extending continuously in a tire circumferential direction such that the main grooves are forming land sections between the tread edges, and lateral grooves formed in the land sections and extending in a direction crossing the main grooves. The main grooves include an inner shoulder-main groove formed closest to the inner tread edge, an outer shoulder-main groove formed closest to the outer tread edge, an inner center-main groove formed between the inner shoulder-main groove and a tire equator, and an outer center-main groove formed between the outer shoulder-main groove and the tire equator. The land sections include an inner middle land section between the inner shoulder-main groove and the inner center-main groove, and an outer middle land section between the outer shoulder-main groove and the outer center-main groove. The lateral grooves include inner middle-lateral grooves formed in the inner middle land section, and outer middle-lateral grooves formed in the outer middle land section. The inner middle-lateral grooves include first inner middle-inclined grooves extending from the inner shoulder-main groove and terminating within the inner middle land section, and second inner middle-inclined grooves extending from the inner center-main groove and terminating within the inner middle land section such that the second inner middle-inclined grooves are inclining in an inclining direction opposite to an inclining direction of the first inner middle-inclined grooves and formed alternately with the first inner middle-inclined grooves. The outer middle-lateral grooves include first outer middle-inclined grooves extending from the outer shoulder-main groove and terminating within the outer middle land section, and second outer middle-inclined grooves extending from the outer center-main groove and terminating within the outer middle land section such that the second outer middle-inclined grooves are inclining in an inclining direction opposite to an inclining direction of the first outer middle-inclined groove and formed alternately with the first outer middle-inclined grooves. The inner and outer middle-lateral grooves are formed such that a total number of the first and second outer middle-inclined grooves is set to be less than a total number of the first and second inner middle-inclined grooves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
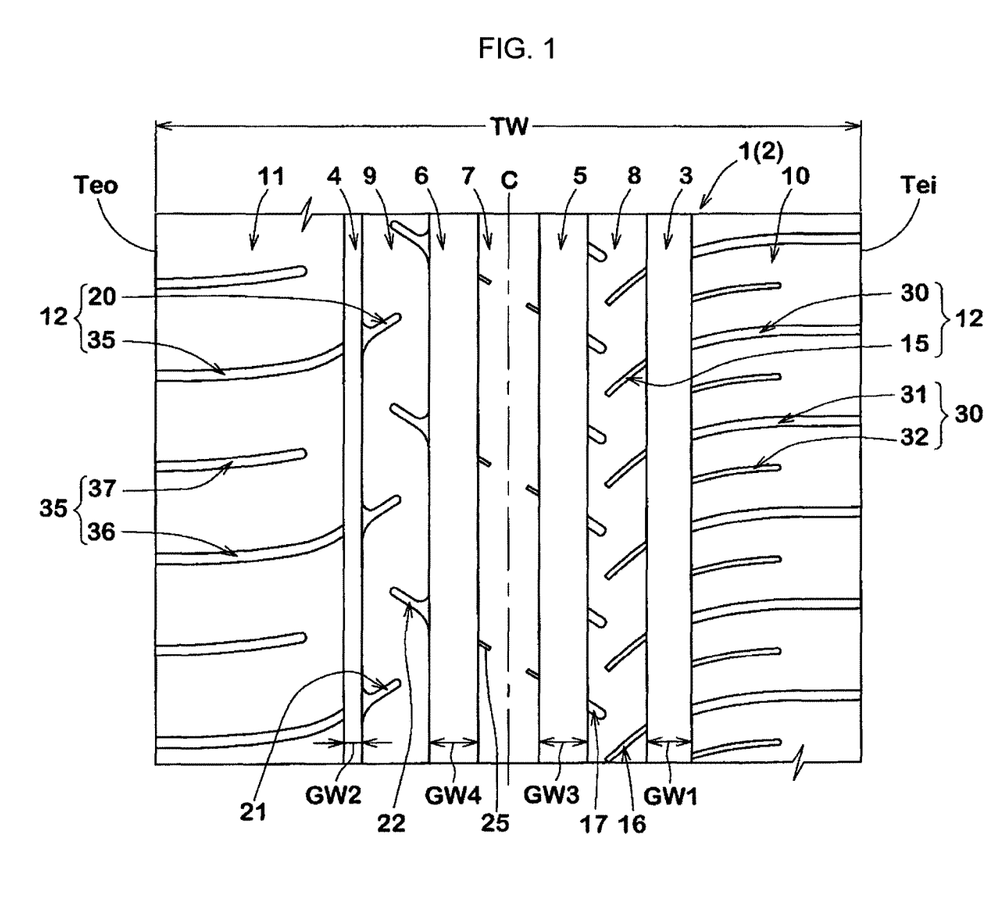
FIG. 1 is a developed view showing the tread of a pneumatic tire according to an embodiment of the present invention.

FIG. 1 is a developed view of tread 2 of pneumatic tire 1 according to the present embodiment. As shown in FIG. 1, pneumatic tire 1 of the present embodiment is a radial tire to be mounted on a passenger car with a designated direction for mounting on a vehicle. The direction for mounting on a vehicle is indicated by using letters or symbols on a sidewall (not shown) of pneumatic tire 1. In FIG. 1, the right side is on the vehicle inner side and the left side is on the vehicle outer side when mounted on a vehicle.

Tread 2 is bordered by inner tread edge (Tei) positioned on the vehicle inner side and outer tread edge (Teo) positioned on the vehicle outer side when the tire is mounted on a vehicle. Between inner tread edge (Tei) and outer tread edge (Teo), multiple main grooves are formed extending continuously in a tire circumferential direction so as to form multiple land sections.

The main grooves of the present embodiment include inner shoulder-main groove 3 positioned closest to inner tread edge (Tei), outer shoulder-main groove 4 positioned closest to outer tread edge (Teo), inner center-main groove 5 positioned between inner shoulder-main groove 3 and tire equator (C), and outer center-main groove 6 positioned between outer shoulder-main groove 4 and tire equator (C).

Main grooves (3~6) are each set to extend straight, for example, in a tire circumferential direction. Accordingly, main grooves (3~6) efficiently discharge the water on the ground surface away from the running tire toward the rear of the vehicle. However, the main grooves may also be formed in a zigzag pattern.

Main grooves (3~6) are each designed to have a certain groove width and groove depth to exhibit excellent drainage capability. To achieve preferable drainage capability, main grooves (3~6) are set to have a groove width of at least 2.5%, more preferably at least 3%, even more preferably at least 4%, of tread contact-patch width (TW). Also, to achieve excellent steering stability by maintaining the ratio with the land sections of tread 2, main grooves (3~6) are each set to have a groove width of no greater than 11.5%, more preferably no greater than 10%, even more preferably no greater than 9%, of tread contact-patch width (TW). In addition, main grooves (3~6) are set to have a groove depth of at least 6 mm, more preferably at least 7 mm, for example.

Tread contact-patch width (TW) indicates the tire axial distance between inner tread edge (Tei) and outer tread edge (Teo) of a tire under normal conditions. "Normal conditions" mean that tire 1 is mounted on a normal rim and is filled with air at a normal inflation pressure while no load is exerted thereon. Unless otherwise specified, measurements of a tire show values obtained when the tire is under normal conditions.

A "normal rim" indicates a rim specified by a regulatory system that includes standards for each tire: it is specified as a "Normal Rim" by JATMA, "Design Rim" by TRA, and "Measuring Rim" by ETRTO.

"Normal inflation pressure" indicates air pressure specified by a regulatory system that includes standards for the tire: it is specified as "Maximum Air Pressure" by JATMA, maximum value listed in the table "Tire Load Limits at Various Cold Inflation Pressures" by TRA, and "Inflation Pressure" by ETRTO. When a tire is for mounting on a passenger car, the normal inflation pressure is uniformly set at 180 kPa.

"Tread edges" are defined as the tire axially outermost points of the tread contact patch when a normal load is exerted on a tire under normal conditions and tread 2 is set on a planar surface with a camber angle of zero degrees.

"Normal load" indicates a load specified by a regulatory system that includes standards for the tire: it is specified as "Maximum Load Capacity" by JATMA, maximum value listed in the table "Tire Load Limits at Various Cold Inflation Pressures" by TRA, and "Load Capacity" by ETRTO. When a tire is for mounting on a passenger car, the normal load is set at 88% of the above load.

It is especially preferred for outer shoulder-main groove 4 to have the smallest groove width (GW2) among main grooves. Such a structure contributes to improving the land ratio of tread 2 on the vehicle outer side, subsequently to enhancing steering stability. When outer shoulder-main groove 4 of a tire is set to have the smallest groove width (GW2), tire noise is less likely to leak outside the vehicle, and the tire exhibits excellent quietness during its run.

On the other hand, near tire equator (C) it is preferred that groove width (GW3) of inner center-main groove 5 or groove width (GW4) of outer center-main groove 6 be set to be the greatest of the main grooves. When the groove width (GW3) or (GW4) is set to be the greatest, the width is especially preferred to be at least 7% of tread contact-patch width (TW). In the present embodiment, groove width (GW3) or (GW4) is set two to three times greater than the groove width (GW2) of outer shoulder-main groove 4. By so setting, drainage capability is significantly enhanced near tire equator (C) of tread 2.

Tread 2 is divided into five land sections by the aforementioned main grooves (3~6).

Land sections include center land section 7 between inner center-main groove 5 and outer center-main groove 6, inner middle land section 8 between inner center-main groove 5 and inner shoulder-main groove 3, outer middle land section 9 between outer center-main groove 6 and outer shoulder-main groove 4, inner shoulder land section 10 on the tire axially outer side of inner shoulder-main groove 3, and outer shoulder land section 11 on the tire axially outer side of outer shoulder-main groove 4.

In the present embodiment, main grooves (3~6) are respectively formed in positions so that center land section 7, inner middle land section 8 and outer middle land section 9 have substantially the same width in a tire axial direction. The difference in widths of land sections (7~9) is preferred to be within 5 mm. On the other hand, inner shoulder land section 10 and outer shoulder land section 11 are set to be wider than any of land sections (7~9). By so setting, the lateral rigidity of inner and outer shoulder land sections (10, 11) is enhanced.

Tread 2 further includes multiple lateral grooves 12 extending in a direction to cross main grooves (3~6) respectively. The detailed structure of each lateral groove is described later.

Figure 2:
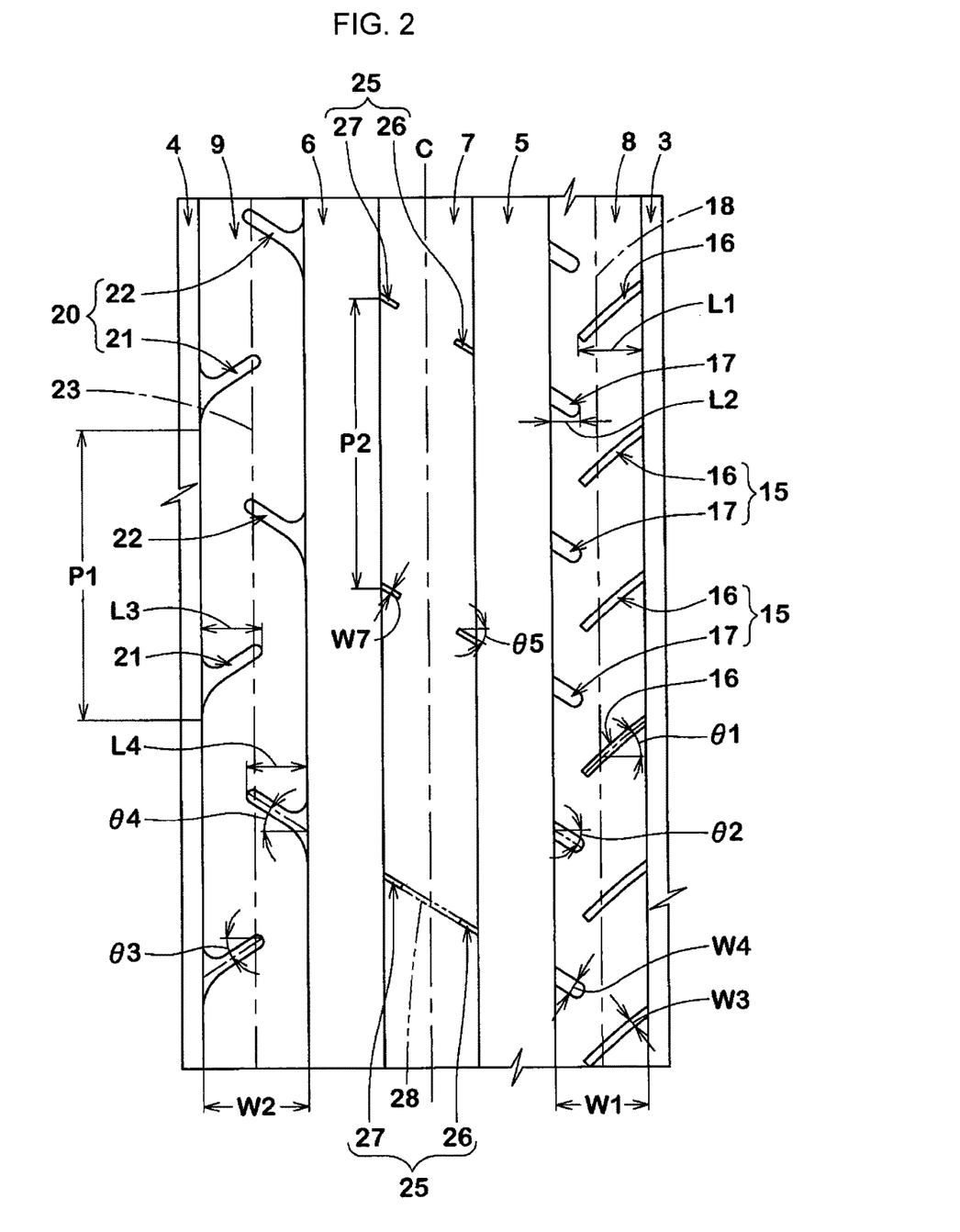
FIG. 2 is an enlarged view showing the inner middle land section, outer middle land section and center land section in FIG. 1.

FIG. 2 is an enlarged view showing inner middle land section 8, outer middle land section 9 and center land section 7 in FIG. 1.

As shown in FIG. 2, inner middle land section 8 is provided with multiple inner middle-lateral grooves 15, which include multiple first inner middle-inclined grooves 16 and multiple second inner middle-inclined grooves 17. First inner middle-inclined groove 16 and second inner middle-inclined groove 17 are formed alternately in a tire circumferential direction.

Each first inner middle-inclined groove 16 extends from inner shoulder-main groove 3 and terminates within inner middle land section 8.

Each first inner middle-inclined groove 16 is set to incline relative to a tire axial direction. Angle ($\theta 1$) of first inner middle-inclined groove 16 is, for example, 25~70 degrees, preferably 35~60 degrees, relative to a tire axial direction.

For example, first inner middle-inclined groove 16 is set to cross center line 18, which evenly bisects the width of inner middle land section 8 and terminates on the tire axially inner side of center line 18. Tire axial length (L1) of first inner middle-inclined groove 16 is preferred to be 0.6~0.85 times the tire axial width (W1) of inner middle land section 8. Such a structure of first inner middle-inclined groove 16 contributes to enhancing drainage capability effectively while minimizing a decrease in steering stability.

Second inner middle-inclined groove 17 extends from inner center-main groove 5 and terminates within inner middle land section 8.

Second inner middle-inclined groove 17 is set to incline in a direction opposite that of first inner middle-inclined groove 16. Angle ($\theta 2$) of second inner middle-inclined groove 17 is, for example, 10~50 degrees, preferably 20~40 degrees, relative to a tire axial direction.

Second inner middle-inclined groove 17 is preferred not to cross center line 18 of inner middle land section 8 but to terminate before reaching the center line. Tire axial length (L2) of second inner middle-inclined groove 17 is preferred to be 0.35~0.50 times the length (L1) of first inner middle-inclined groove 16. Such a structure of second inner middle-inclined groove 17 contributes to suppressing uneven wear in the region on the tire axially inner side of inner middle land section 8.

Groove width (W4) of second inner middle-inclined groove 17 is preferred to be greater than groove width (W3) of first inner middle-inclined groove 16, for example. Groove width (W4) of second inner middle-inclined groove 17 is more preferred to be 1.7~2.2 times the groove width (W3) of first inner middle-inclined groove 16, for example. Such a structure of second inner middle-inclined groove 17 exhibits excellent wet performance while maintaining the rigidity of inner middle land section 8.

Outer middle land section 9 is provided with multiple outer middle-lateral grooves 20, which include multiple first outer middle-inclined grooves 21 and multiple second outer middle-inclined grooves 22. Each first outer middle-inclined groove 21 extends from outer shoulder-main groove 4 and terminates within outer middle land section 9. Each second outer middle-inclined groove 22 extends from outer center-main groove 6 and terminates within outer middle land section 9.

First outer middle-inclined groove 21 and second outer middle-inclined groove 22 are set to incline in opposite directions and are formed alternately in a tire circumferential direction.

The aforementioned inner middle-lateral grooves 15 and outer middle-lateral grooves 20 are connected to shoulder-main grooves (3, 4) or center-main grooves (5, 6), and terminate within the land section. Accordingly, excellent wet performance is achieved while the rigidity of middle land sections (8, 9) is maintained.

Moreover, middle land sections (8, 9) are provided with inclined grooves, which are set to incline in different directions from each other and to be positioned alternately in a tire circumferential direction. Thus, middle land sections (8, 9) deform linearly in response to the degree of steering during turning without following the direction of a load exerted on the land section. Accordingly, linear transient response is achieved during turning, and excellent steering stability is thereby achieved.

Moreover, total number (N2) of first and second outer middle-inclined grooves (21, 22) in the tire circumference is set less than total number (N1) of first and second inner middle-inclined grooves (16, 17) in the tire circumference. By so setting, the rigidity of outer middle land section 9 is maintained higher than that of inner middle land section 8. Accordingly, even during a sharp turn when a greater load is exerted on outer middle land section 9, excellent steering responsiveness is achieved, and steering stability is thereby enhanced.

The aforementioned total number (N2) is preferred to be no greater than 0.6 times, more preferably no greater than 0.5 times, the total number (N1). To maintain excellent wet performance, the total number (N2) is preferred to be at least 0.3 times, more preferably at least 0.4 times, the total number (N1).

In the present embodiment, first outer middle-inclined groove 21 is set to incline in the same direction as that of first inner middle-inclined groove 16, while second outer middle-inclined groove 22 is set to incline in the same direction as that of second inner middle-inclined groove 17. By so setting, middle land sections (8, 9) wear uniformly.

To achieve both steering stability and wet performance, angle ($\theta 3$) of first outer middle-inclined groove 21 relative to the tire axial direction and angle ($\theta 4$) of second outer middle-inclined groove 22 relative to the tire axial direction are preferred to be, for example, at least 20 degrees, more preferably at least 25 degrees, and to be no greater than 40 degrees, more preferably no greater than 35 degrees.

First and second outer middle-inclined grooves (21, 22) are each preferred to cross center line 23 evenly bisecting the width of outer middle land section 9. Such a structure of first and second outer middle-inclined grooves (21, 22) contributes to effectively discharging water away from between outer middle land section 9 and the ground surface while running on a wet surface, and to suppressing a hydroplaning phenomenon.

To achieve the aforementioned effects while maintaining steering stability, tire axial length (L3) of first outer middle-inclined groove 21 and tire axial length (L4) of second outer middle-inclined groove 22 are preferred to have a total (L3+L4) of 105%~115% of width (W2) of outer middle land section 9.

Center land section 7 is provided with multiple center-lateral grooves 25, which include inner center-inclined grooves 26 that extend from inner center-main groove 5 and terminate within center land section 7 and outer center-inclined grooves 27 that extend from outer center-main groove 6 and terminate within center land section 7. Accordingly, center land section 7 is formed in a rib pattern that extends continuously in a tire circumferential direction.

Inner center-inclined grooves 26 and outer center-inclined grooves 27 are formed at positional pitch (P2), which is set to be, for example, 0.95~1.05 times the positional pitch (P1) of outer middle-lateral grooves 20. Positional pitch (P2) is preferred to be substantially equal to positional pitch (P1).

Inner center-inclined grooves 26 and outer center-inclined grooves 27 are set to incline in the same direction relative to a tire axial direction, for example. Angle ($\theta 5$) of inner center-inclined grooves 26 and outer center-inclined grooves 27 is, for example, 25~35 degrees relative to a tire axial direction. Angle ($\theta 5$) is preferred to be substantially equal to angle ($\theta 4$) of second outer middle-inclined grooves 22, for example.

Virtually extended line 28 of inner center-inclined groove 26 is preferred to be connected to outer center-inclined groove 27. By so setting, contact-patch deformation at center land section 7 at the time of ground contact is suppressed, and uneven wear is thereby suppressed.

Inner center-inclined groove 26 is preferred to make a smooth transition to second inner middle-inclined groove 17 when connected through inner center-main groove 5. Also, outer center-inclined groove 27 is preferred to make a smooth transition to second outer middle-inclined groove 22 when connected through outer center-main groove 6. By so setting, while running on a wet surface, center-lateral groove 25, second inner middle-inclined groove 17 and second outer middle-inclined groove 22 work together to break up the water screen near tire equator (C), thus effectively suppressing hydroplaning. Moreover, by forming lateral grooves as above, wear in center land section 7 and middle land sections (8, 9) will progress uniformly, and the tire lifespan is prolonged.

Center-lateral groove 25 is preferred to have groove width (W7) smaller than that of inner middle-lateral groove 15 and outer middle-lateral groove 20, for example. Groove width (W7) of center-lateral groove 25 is set to be 0.25~0.35 times the groove width (W4) of second inner middle-inclined groove 17, for example. Such a structure of center-lateral groove 25 contributes to maintaining the rigidity of center land section 7 and enhancing steering stability.

Figure 3:
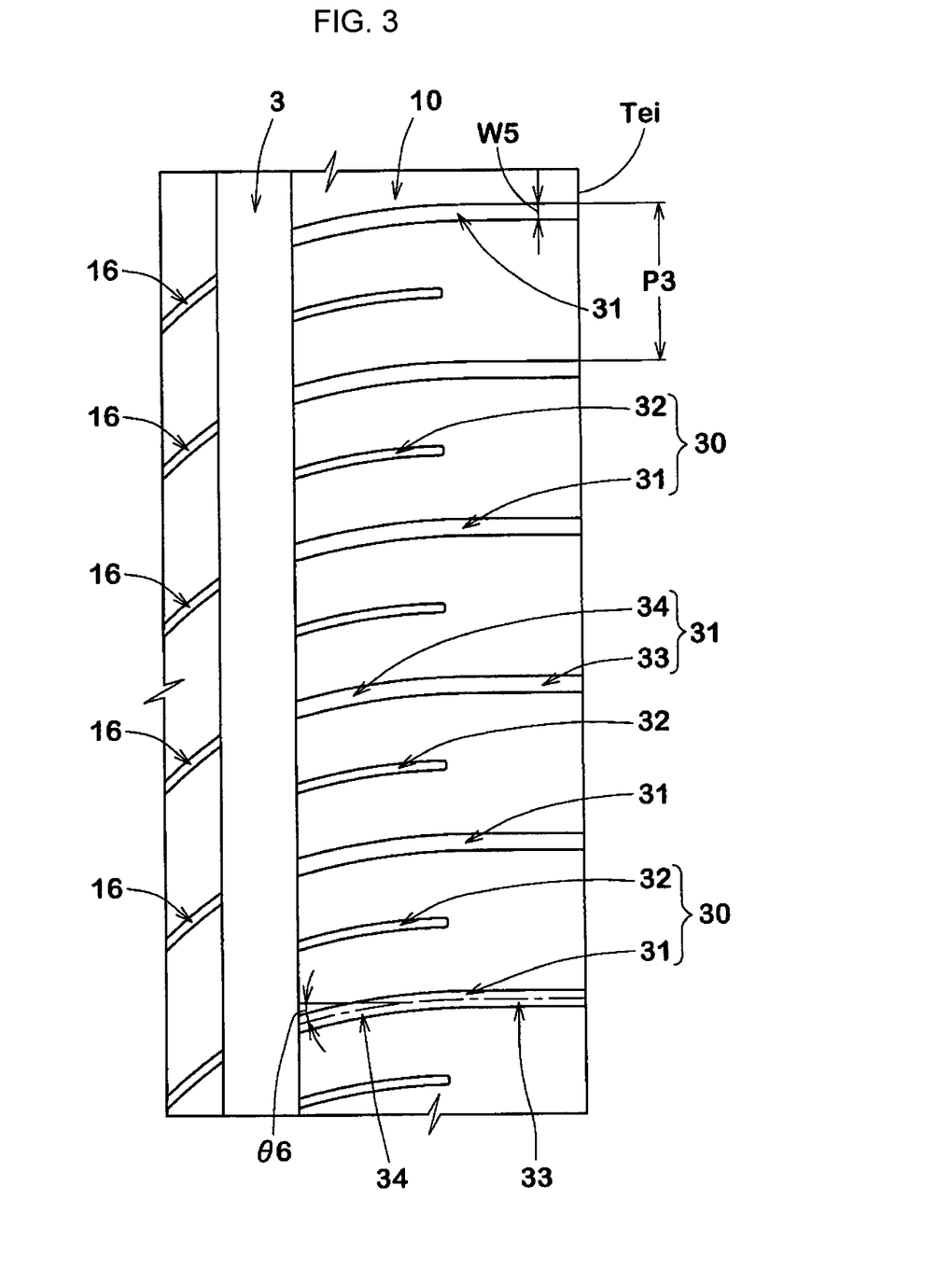
FIG. 3 is an enlarged view showing the inner shoulder land section in FIG. 1.

FIG. 3 is an enlarged view showing inner shoulder land section 10 in FIG. 1. As shown in FIG. 3, inner shoulder land section 10 is provided with multiple inner shoulder-lateral grooves 30, which include first inner shoulder-lateral grooves 31 and second inner shoulder-lateral grooves 32, for example.

First inner shoulder lateral groove 31 extends from inner shoulder-main groove 3 to inner tread edge (Tei), for example.

First inner shoulder-lateral groove 31 includes straight component 33, which extends straight along a tire axial direction on the inner tread-edge (Tei) side, and curved component 34, which is connected to straight component 33 and extends in the tire axially inward direction.

Angle (θ6) of curved component 34 relative to a tire axial direction is set to increase gradually toward tire equator (C), for example. Such a structure of first inner shoulder-lateral groove 31 contributes to directing some of the water in inner shoulder-main groove 3 in the tire axially outward direction while running on a wet surface so that wet performance is enhanced.

First inner shoulder-lateral groove 31 of the present embodiment is preferred to make a smooth transition to first inner middle-inclined groove 16 when connected through inner shoulder-main groove 3. Such a structure of first inner shoulder-lateral groove 31 directs the water in inner shoulder-main groove 3 toward inner tread edge (Tei) during a wet run by utilizing the inertia of water directed toward inner shoulder-main groove 3 through first inner shoulder-lateral groove 31. Accordingly, even higher drainage capability is achieved.

Second inner shoulder-lateral groove 32 extends from inner shoulder-main groove 3 in the tire axially outward direction and terminates within inner shoulder land section 10, for example. Such a structure of second inner shoulder-lateral groove 32 contributes to enhancing steering stability while suppressing uneven wear of inner shoulder land section 10.

Second inner shoulder-lateral groove 32 is preferred to extend along curved component 34 of first inner shoulder lateral groove 31. Such second inner shoulder-lateral groove 32 contributes to the uniform wear of inner shoulder land section 10.

To achieve well-balanced enhancement of steering stability and wet performance, groove width (W5) of inner shoulder-lateral groove 30 is preferred to be at least 7.0%, more preferably at least 7.5%, and no greater than 9.0%, more preferably no greater than 8.5%, of positional pitch (P3) of inner shoulder-lateral groove 30.

From the same viewpoints, the groove depth of inner shoulder-lateral groove 30 is preferred to be at least 5.0 mm, more preferably 6.2 mm, and to be no greater than 7.0 mm, more preferably no greater than 6.6 mm.

Figure 4:
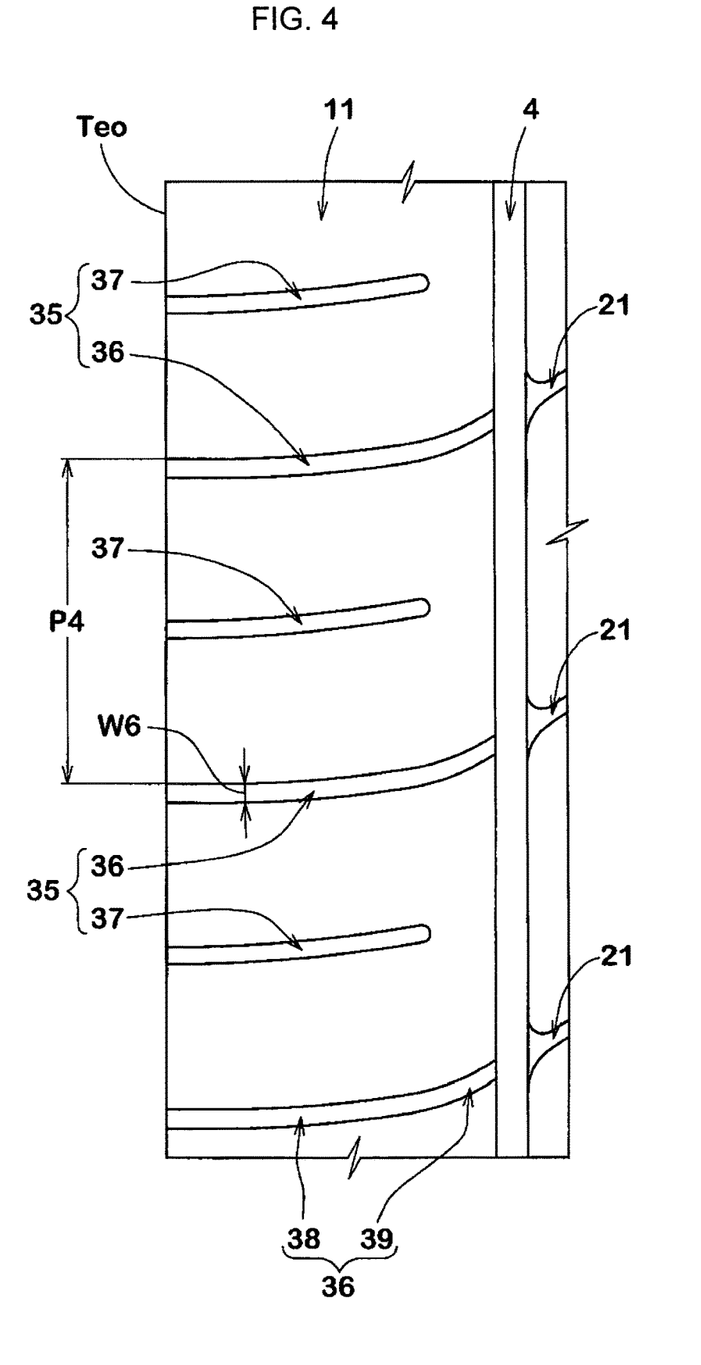
FIG. 4 is an enlarged view showing the outer shoulder land section in FIG. 1.

FIG. 4 is an enlarged view showing outer shoulder land section 11 in FIG. 1. As shown in FIG. 4, outer shoulder land section 11 is provided with multiple outer shoulder-lateral grooves 35, which include first outer shoulder-lateral groove 36 and second outer shoulder-lateral groove 37, for example.

First outer shoulder-lateral groove 36 extends from outer shoulder-main groove 4 to outer tread edge (Teo), for example.

First outer shoulder-lateral groove 36 includes, for example, a first curved component 38, which is positioned on the outer tread-edge (Teo) side and gently curves at a substantially constant curvature radius along a tire axial direction, for example, and a second curved component 39, which is connected to the tire axially inner side of first curved component 38 and curves at a smaller curvature radius than that of first curved component 38.

First outer shoulder-lateral groove 36 is preferred to make a smooth transition to first outer middle-inclined groove 21 when connected through outer shoulder-main groove 4, for example. By so setting, along with the aforementioned structures of first and second curved components (38, 39), the water in outer shoulder-main groove 4 is directed effectively in the tire axially outward direction during a wet run.

Second outer shoulder-lateral groove 37 extends from outer tread edge (Teo) in the tire axially inward direction and terminates within outer shoulder land section 11, for example. Second outer shoulder-lateral groove 37 extends along first curved component 38 of first outer shoulder-lateral groove 36. Such a structure of second outer shoulder-lateral groove 37 contributes to suppressing wandering while maintaining the rigidity of outer shoulder land section 11.

Total number (N4) of outer shoulder-lateral grooves 35 is preferred to be less than total number (N3) of inner shoulder-lateral grooves 30 (shown in FIG. 3), for example. By so setting, the rigidity of outer shoulder land section 11 is maintained higher than that of inner shoulder land section 10. Thus, even during a sharp turn when a greater load is exerted on outer shoulder land section 11, excellent steering responsiveness is obtained, and steering stability is thereby enhanced.

To achieve the aforementioned effects while maintaining wet performance, total number (N4) above is preferred to be no greater than 0.6 times, more preferably no greater than 0.5 times, and at least 0.3 times, more preferably at least 0.4 times, the above total number (N3).

Groove width (W6) of outer shoulder-lateral groove 35 is preferred to be at least 3.0%, more preferably at least 3.8%, and no greater than 5.0%, more preferably no greater than 4.5%, of positional pitch (P4) of outer shoulder-lateral groove 35. By so setting, well-balanced enhancement of steering stability and wet performance is achieved.

From the same viewpoints, the groove depth of outer shoulder-lateral groove 35 is preferred to be at least 5.0 mm, more preferably 6.2 mm, and no greater than 7.0 mm, more preferably no greater than 6.6 mm.

So far, an embodiment of the present invention has been described in detail with reference to the accompanying drawings. However, the present invention is not limited to the aforementioned embodiment, and various modifications are possible for carrying out the present invention.

EXAMPLES

Figure 5:
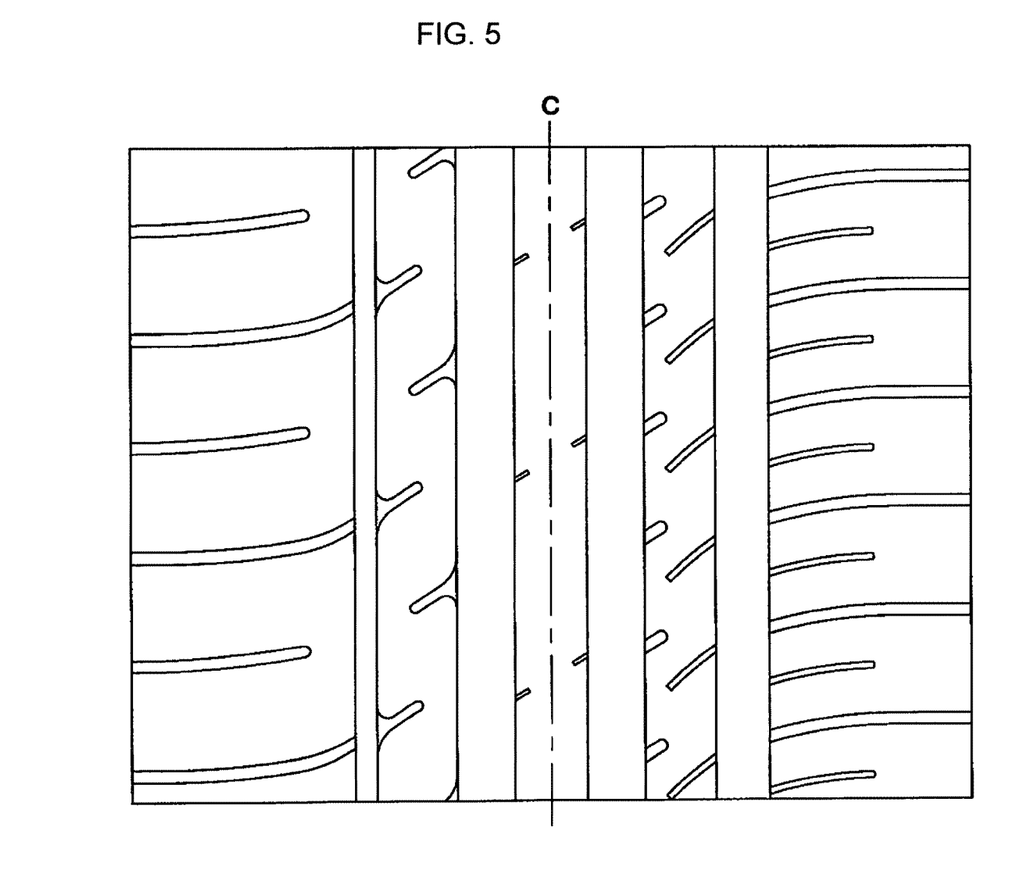
FIG. 5 is a developed view of the tread of a pneumatic tire according to a comparative example.

Test pneumatic tires for passenger cars with a size of 245/45R18 and having the basic pattern shown in FIG. 1 were prepared according to specifications in Table 1. As a comparative example, a tire was prepared to have middle-lateral grooves set to incline in the same direction as shown in FIG. 5. The steering stability, wet performance and wear resistance of each test tire were evaluated. The common specifications for each test tire and test methods are as follows.

rim: 18×8J
test vehicle: passenger car with a displacement of 3500 cc
inflation pressure: 230 kPa
position of test tires to be mounted: all wheels Steering Stability A professional test driver drove the test vehicle with test tires mounted thereon on a test course to conduct sensory evaluation of steering stability, including steering wheel responsiveness, rigidity feel, grip and the like. Results are shown in ratings by setting the value obtained in the comparative example at 100. The greater the value, the more outstanding is the steering stability.

Wet Performance

Into a test asphalt course with a radius of 100 m, where a 20-m-long, 5-mm-deep puddle was formed, the above vehicle was directed by increasing its speed incrementally and lateral acceleration (lateral G) was measured. The results are average lateral G measured at the front wheels at a speed of 50~80 km/h and shown in indices by setting the value obtained in the comparative example at 100. The greater the value, the more outstanding is the wet performance.

Wear Resistance

The degree of wear in the land sections was measured after the vehicle was run on a dry surface for a certain distance. The results are shown in indices by inverting the values and by setting the value in the comparative example at 100. The greater the value, the more outstanding is the indicated wear resistance.

Test results are all shown in Table 1.

TABLE 1

|  | Comp. Examp. | Examp. 1 | Examp. 2 | Examp. 3 | Examp. 4 | Examp. 5 | Examp. 6 | Examp. 7 |
|---|---|---|---|---|---|---|---|---|
| Figure Showing Tread Pattern | FIG. 5 | FIG. 1 | FIG. 1 | FIG. 1 | FIG. 1 | FIG. 1 | FIG. 1 | FIG. 1 |
| Total Number (N2) of Outer Middle-Lateral Grooves/Total Number (N1) of Inner Middle-Lateral Grooves | 0.45 | 0.45 | 0.30 | 0.40 | 0.50 | 0.60 | 0.60 | 0.45 |
| Total Number (N4) of Outer Shoulder-Lateral Grooves/Total Number (N3) of Inner Shoulder-Lateral Grooves | 0.45 | 0.45 | 0.30 | 0.40 | 0.50 | 0.60 | 0.45 | 0.60 |
| Groove Width (W5) of Inner Shoulder-Lateral Groove/Positional Pitch (P3) (%) | 8.0 | 8.0 | 8.0 | 8.0 | 8.0 | 8.0 | 8.0 | 8.0 |
| Groove Depth of Inner Shoulder-Lateral Groove (mm) | 6.4 | 6.4 | 6.4 | 6.4 | 6.4 | 6.4 | 6.4 | 6.4 |
| Groove Width (W6) of Outer Shoulder-Lateral Groove/Positional Pitch (P4) (%) | 4.0 | 4.0 | 4.0 | 4.0 | 4.0 | 4.0 | 4.0 | 4.0 |
| Groove Depth of Outer Shoulder-Lateral Groove (mm) | 6.4 | 6.4 | 6.4 | 6.4 | 6.4 | 6.4 | 6.4 | 6.4 |
| Steering Stability (rating) | 100 | 110 | 112 | 111 | 110 | 108 | 109 | 108 |
| Wet Performance (index) | 100 | 103 | 99 | 101 | 104 | 105 | 105 | 104 |
| Wear Resistance (index) | 100 | 105 | 106 | 105 | 104 | 102 | 103 | 104 |

|  | Examp. 8 | Examp. 9 | Examp. 10 | Examp. 11 | Examp. 12 | Examp. 13 | Examp. 14 | Examp. 15 |
|---|---|---|---|---|---|---|---|---|
| Figure Showing Tread Pattern | FIG. 1 | FIG. 1 | FIG. 1 | FIG. 1 | FIG. 1 | FIG. 1 | FIG. 1 | FIG. 1 |
| Total Number (N2) of Outer Middle-Lateral Grooves/Total Number (N1) of Inner Middle-Lateral Grooves | 0.45 | 0.45 | 0.45 | 0.45 | 0.45 | 0.45 | 0.45 | 0.45 |
| Total Number (N4) of Outer Shoulder-Lateral Grooves/Total Number (N3) of Inner Shoulder-Lateral Grooves | 0.45 | 0.45 | 0.45 | 0.45 | 0.45 | 0.45 | 0.45 | 0.45 |
| Groove Width (W5) of Inner Shoulder-Lateral Groove/Positional Pitch (P3) (%) | 7.0 | 7.5 | 8.5 | 9.0 | 8.0 | 8.0 | 8.0 | 8.0 |
| Groove Depth of Inner Shoulder-Lateral Groove (mm) | 6.4 | 6.4 | 6.4 | 6.4 | 5.0 | 5.5 | 6.6 | 7.0 |
| Groove Width (W6) of Outer Shoulder-Lateral Groove/Positional Pitch (P4) (%) | 4.0 | 4.0 | 4.0 | 4.0 | 4.0 | 4.0 | 4.0 | 4.0 |
| Groove Depth of Outer Shoulder-Lateral Groove (mm) | 6.4 | 6.4 | 6.4 | 6.4 | 6.4 | 6.4 | 6.4 | 6.4 |
| Steering Stability (rating) | 111 | 110 | 109 | 107 | 111 | 110 | 109 | 108 |
| Wet Performance (index) | 100 | 102 | 103 | 104 | 99 | 102 | 103 | 103 |
| Wear Resistance (index) | 105 | 105 | 105 | 105 | 105 | 105 | 105 | 105 |

|  | Examp. 16 | Examp. 17 | Examp. 18 | Examp. 19 | Examp. 20 | Examp. 21 | Examp. 22 | Examp. 23 |
|---|---|---|---|---|---|---|---|---|
| Figure Showing Tread Pattern | FIG. 1 | FIG. 1 | FIG. 1 | FIG. 1 | FIG. 1 | FIG. 1 | FIG. 1 | FIG. 1 |
| Total Number (N2) of Outer Middle-Lateral Grooves/Total Number (N1) of Inner Middle-Lateral Grooves | 0.45 | 0.45 | 0.45 | 0.45 | 0.45 | 0.45 | 0.45 | 0.45 |
| Total Number (N4) of Outer Shoulder-Lateral Grooves/Total Number (N3) of Inner Shoulder-Lateral Grooves | 0.45 | 0.45 | 0.45 | 0.45 | 0.45 | 0.45 | 0.45 | 0.45 |
| Groove Width (W5) of Inner Shoulder-Lateral Groove/Positional Pitch (P3) (%) | 8.0 | 8.0 | 8.0 | 8.0 | 8.0 | 8.0 | 8.0 | 8.0 |
| Groove Depth of Inner Shoulder-Lateral Groove (mm) | 6.4 | 6.4 | 6.4 | 6.4 | 6.4 | 6.4 | 6.4 | 6.4 |
| Groove Width (W6) of Outer Shoulder-Lateral Groove/Positional Pitch (P4) (%) | 3.0 | 3.8 | 4.5 | 5.0 | 4.0 | 4.0 | 4.0 | 4.0 |
| Groove Depth of Outer Shoulder-Lateral Groove (mm) | 6.4 | 6.4 | 6.4 | 6.4 | 5.0 | 5.5 | 6.6 | 7.0 |
| Steering Stability (rating) | 110 | 110 | 109 | 108 | 111 | 110 | 110 | 109 |
| Wet Performance (index) | 99 | 101 | 103 | 103 | 99 | 102 | 103 | 103 |
| Wear Resistance (index) | 106 | 105 | 105 | 104 | 106 | 105 | 104 | 104 |

From the test results, tires of the examples were confirmed to have excellent steering stability while maintaining wet performance, compared with the tire of the comparative example. Namely, tires of the examples were confirmed to have well-balanced enhancement of steering stability and wet performance.

A pneumatic tire with a designated direction to be mounted on a four-wheel vehicle may be is provided with lateral grooves in the outer and inner middle land sections.

However, when the outer middle land section of such a pneumatic tire has no lateral groove connected to the center-main groove, wet performance needs to be further improved.

Moreover, in such a pneumatic tire, when lateral grooves formed in the inner middle land section are each set to incline in the same direction, the inner middle land section having such lateral grooves tends to deform significantly when affected by a force in a direction perpendicular to lateral grooves. Thus, in the inner middle land section, the degree of deformation when turning right differs from that when turning left. Especially when the vehicle turns at a specific steering angle, the tire deforms significantly. Therefore, the pneumatic tire exhibits a low transient response during turning, and steering stability tends to be low as a result.

A pneumatic tire according to an embodiment of the present invention exhibits well-balanced enhancement of steering stability and wet performance.

A pneumatic tire according to an embodiment of the present invention has a tread with a designated direction to be mounted on a vehicle. The tread includes an inner tread edge to be positioned on the vehicle inner side and an outer tread edge to be positioned on the vehicle outer side when mounted on a vehicle, multiple main grooves extending continuously in a tire circumferential direction so as to form multiple land sections between the tread edges, and multiple lateral grooves extending in a direction to cross the main grooves. The main grooves include an inner shoulder-main groove positioned closest to the inner tread edge, an outer shoulder-main groove positioned closest to the outer tread edge, an inner center-main groove positioned between the inner shoulder-main groove and the tire equator, and an outer center-main groove positioned between the outer shoulder-main groove and the tire equator. The land sections include an inner middle land section between the inner shoulder-main groove and the inner center-main groove, and an outer middle land section between the outer shoulder-main groove and the outer center-main groove. The lateral grooves include inner middle-lateral grooves formed in the inner middle land section, and the outer middle-lateral grooves formed in the outer middle land section. The inner middle-lateral grooves include a first inner middle-inclined groove that extends from the inner shoulder-main groove and terminates within the inner middle land section, and a second inner middle-inclined groove that extends from the inner center-main groove and terminates within the inner middle land section while inclining in a direction opposite that of the first inner middle-inclined groove and being formed alternately with the first inner middle-inclined groove. Also, the outer middle-lateral grooves include a first outer middle-inclined groove that extends from the outer shoulder-main groove and terminates within the outer middle land section, and a second outer middle-inclined groove that extends from the outer center-main groove and terminates within the outer middle land section while inclining in a direction opposite that of the first outer middle-inclined groove and being formed alternately with the first outer middle-inclined groove. Moreover, the total number of the first and second outer middle-inclined grooves is set to be less than the total number of the first and second inner middle-inclined grooves.

In a pneumatic tire according to an embodiment of the present invention, it is preferred that the land sections include a center land section positioned between the inner center-main groove and the outer center-main groove; and that center-lateral grooves formed in the center land section include an inner center-inclined groove that extends from the inner center-main groove and terminates within the center land section, and an outer center-inclined groove that extends from the outer center-main groove and terminates within the center land section. Also, the inner center-inclined groove is preferred to make a smooth transition to the second inner middle-inclined groove when connected through the inner center-main groove, while the outer center-inclined groove make a smooth transition to the second outer middle-inclined groove when connected through the outer center-main groove.

In a pneumatic tire according to an embodiment of the present invention, it is preferred that the land sections include an inner shoulder land section positioned on the tire axially outer side of the inner shoulder-main groove, and that inner shoulder-lateral grooves formed in the inner shoulder land section include a first inner shoulder-lateral groove that makes a smooth transition to the first inner middle-inclined groove when connected through the inner shoulder-main groove, and a second inner shoulder-lateral groove that extends from the inner shoulder-main groove in the tire axially outward direction and terminates within the inner shoulder land section.

In a pneumatic tire according to an embodiment of the present invention, the inner shoulder-lateral grooves are each preferred to have a groove width of 7.0~9.0% of the positional pitch and a groove depth of 5.0~7.0 mm.

In a pneumatic tire according to an embodiment of the present invention, it is preferred that the land sections include an outer shoulder land section positioned on the tire axially outer side of the outer shoulder-main groove, and that outer shoulder-lateral grooves formed in the outer shoulder land section include a first outer shoulder-lateral groove that makes a smooth transition to the first outer middle-inclined groove when connected through the outer shoulder-main groove, and a second outer shoulder-lateral groove that extends from the outer tread edge in the tire axially inward direction and terminates within the outer shoulder land section.

In a pneumatic tire according to an embodiment of the present invention, the first outer middle-inclined groove and the second outer middle-inclined groove are preferred to cross the center line that evenly bisects the width of the outer middle land section.

In a pneumatic tire according to an embodiment of the present invention, the first inner middle-inclined groove is preferred to cross the center line that evenly bisects the width of the inner middle land section, whereas the second inner middle-inclined groove is preferred not to cross the center line of the inner middle land section but to terminate before reaching the center line.

In a pneumatic tire according to an embodiment of the present invention, the inner middle-lateral grooves formed in the inner middle land section include first inner middle-inclined grooves that extend from the inner shoulder-main groove and terminate within the inner middle land section, and second inner middle-inclined grooves that extend from the inner center-main groove and terminate within the inner middle land section while inclining in a direction opposite that of the first inner middle-inclined grooves and being formed alternately with the first inner middle-inclined grooves. In the same manner, the outer middle-lateral grooves formed in the outer middle land section include first outer middle-inclined grooves that extend from the outer shoulder-main groove and terminate within the outer middle land section, and second outer middle-inclined grooves that extend from the outer center-main groove and terminate within the outer middle land section while inclining in a direction opposite that of the first outer middle-inclined grooves and being formed alternately with the first outer middle-inclined grooves.

The aforementioned middle-lateral grooves are each set to connect to the shoulder-main groove or center-main groove and to terminate within the land section, and thus the rigidity of each middle land section is maintained and excellent wet performance is achieved. Moreover, in each middle land section, inclined grooves set to incline in different directions from each other are alternately formed in a tire circumferential direction. Accordingly, each middle land section deforms linearly in response to the degree of steering during turning without following the direction of a load exerted on the land section. Therefore, a linear transient response is obtained during turning and excellent steering stability is thereby achieved.

The total number of the first and second outer middle-inclined grooves is set to be less than the total number of the first and second inner middle-inclined grooves. As a result, the rigidity of the outer middle land section is maintained higher than that of the inner middle land section. Accordingly, even during a sharp turn when a greater load is exerted on the outer middle land section, excellent steering responsiveness is obtained and steering stability is thereby enhanced.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
a tread having a designated direction to be mounted on a vehicle and having an inner tread edge positioned to be on a vehicle inner side and an outer tread edge to be positioned on a vehicle outer side when mounted on a vehicle, the tread having a plurality of main grooves extending continuously in a tire circumferential direction such that the plurality of main grooves is forming a plurality of land sections between the tread edges, and a plurality of lateral grooves formed in the land sections and extending in a direction crossing the main grooves,
wherein the plurality of main grooves includes an inner shoulder-main groove formed closest to the inner tread edge, an outer shoulder-main groove formed closest to the outer tread edge, an inner center-main groove formed between the inner shoulder-main groove and a tire equator, and an outer center-main groove formed between the outer shoulder-main groove and the tire equator, the plurality of land sections includes an inner middle land section between the inner shoulder-main groove and the inner center-main groove, and an outer middle land section between the outer shoulder-main groove and the outer center-main groove, the plurality of lateral grooves includes a plurality of inner middle-lateral grooves formed in the inner middle land section, and a plurality of outer middle-lateral grooves formed in the outer middle land section, the plurality of inner middle-lateral grooves includes a plurality of first inner middle-inclined grooves extending from the inner shoulder-main groove and terminating within the inner middle land section, and a plurality of second inner middle-inclined grooves extending from the inner center-main groove and telininating within the inner middle land section such that the second inner middle-inclined grooves are inclining in an inclining direction opposite to an inclining direction of the first inner middle-inclined grooves and formed alternately with the first inner middle-inclined grooves, the plurality of inner middle-lateral grooves is formed such that each of the second inner middle-inclined grooves has a groove width that is greater than a groove width of each of the first inner middle-inclined grooves, the plurality of outer middle-lateral grooves includes a plurality of first outer middle-inclined grooves extending from the outer shoulder-main groove and terminating within the outer middle land section, and a plurality of second outer middle-inclined grooves extending from the outer center-main groove and terminating within the outer middle land section such that the second outer middle-inclined grooves are inclining in an inclining direction opposite to an inclining direction of the first outer middle-inclined groove and formed alternately with the first outer middle-inclined grooves, the inner and outer middle-lateral grooves are formed such that a total number of the first and second outer middle-inclined grooves is set to be less than a total number of the first and second inner middle-inclined grooves, the plurality of land sections includes an inner shoulder land section on a tire axially outer side of the inner shoulder-main groove, and the plurality of lateral grooves includes a plurality of inner shoulder-lateral grooves formed in the inner shoulder land section such that the plurality of inner shoulder-lateral grooves includes a plurality of first inner shoulder-lateral grooves connected to the first inner middle-inclined grooves through the inner shoulder-main groove in smooth transition, respectively, and a plurality of second inner shoulder-lateral grooves extending from the inner shoulder-main groove in a tire axially outward direction and terminating within the inner shoulder land section, and that each of the inner shoulder-lateral grooves has a groove width in a range of 7.0% to 9.0% of a positional pitch and a groove depth in a range of 5.0 mm to 7.0 mm.

2. The pneumatic tire according to claim 1, wherein the plurality of land sections includes a center land section between the inner center-main groove and the outer center-main groove, the plurality of lateral grooves includes a plurality of center-lateral grooves formed in the center land section such that the plurality of center-lateral grooves includes a plurality of inner center-inclined grooves extending from the inner center-main groove and terminating within the center land section, and a plurality of outer center-inclined grooves extending from the outer center-main groove and terminating within the center land section, the plurality of inner center-inclined grooves is formed such that each of the inner center-inclined grooves is connecting to a respective one of the second inner middle-inclined grooves in smooth transition, and the plurality of outer center-inclined grooves is formed such that each of the outer center-inclined grooves is connected to a respective one of the second outer middle-inclined grooves in smooth transition.

3. The pneumatic tire according to claim 2, wherein the plurality of land sections includes an outer shoulder land section on a tire axially outer side of the outer shoulder-main groove, and the plurality of lateral grooves includes a plurality of outer shoulder-lateral grooves formed in the outer shoulder land section such that the plurality of outer shoulder-lateral grooves includes a plurality of first outer shoulder-lateral grooves connected to the first outer middle-inclined grooves through the outer shoulder-main groove in smooth transition, respectively, and a plurality of second outer shoulder-lateral grooves extending from the outer tread edge in a tire axially inward direction and terminating within the outer shoulder land section.

4. The pneumatic tire according to claim 2, wherein the plurality of first outer middle-inclined grooves and the plurality of second outer middle-inclined grooves are formed such that each of the first and second outer middle-inclined grooves is crossing a center line evenly bisecting a width of the outer middle land section.

5. The pneumatic tire according to claim 2, wherein the plurality of first inner middle-inclined grooves is formed such that each of the first inner middle-inclined grooves is crossing a center line evenly bisecting a width of the inner middle land section, and the plurality of second inner middle-inclined grooves is formed such that each of the second inner middle-inclined grooves is not crossing the center line of the inner middle land section and terminating before reaching the center line.

6. The pneumatic tire according to claim 2, wherein the plurality of first inner middle-inclined grooves is formed such that each of the first inner middle-inclined grooves has an angle in a range of 25 degrees to 70 degrees relative to a tire axial direction, and the plurality of second inner middle-inclined grooves is formed such that each of the second inner middle-inclined grooves has an angle in a range of 10 degrees to 50 degrees relative to the tire axial direction.

7. The pneumatic tire according to claim 2, wherein the plurality of first inner middle-inclined grooves is formed such that each of the first inner middle-inclined grooves has an angle in a range of 35 degrees to 60 degrees relative to a tire axial direction, and the plurality of second inner middle-inclined grooves is formed such that each of the second inner middle-inclined grooves has an angle in a range of 20 degrees to 40 degrees relative to the tire axial direction.

8. The pneumatic tire according to claim 2, wherein the plurality of inner middle-lateral grooves is formed such that each of the second inner middle-inclined grooves has the groove width in a range of 1.7 to 2.2 times the groove width of each of the first inner middle-inclined grooves.

9. The pneumatic tire according to claim 2, wherein the plurality of first inner middle-inclined grooves is formed such that each of the first inner middle-inclined grooves has a tire axial length in a range of 0.6 to 0.85 times the width of the inner middle land section and an angle in a range of 25 degrees to 70 degrees relative to a tire axial direction, the plurality of second inner middle-inclined grooves is formed such that each of the second inner middle-inclined grooves has a tire axial length in a range of 0.35 to 0.50 times the tire axial length of the first inner middle-inclined grooves and an angle in a range of 10 degrees to 50 degrees relative to the tire axial direction, and the plurality of inner middle-lateral grooves is formed such that each of the second inner middle-inclined grooves has the groove width in a range of 1.7 to 2.2 times the groove width of each of the first inner middle-inclined grooves.

10. The pneumatic tire according to claim 1, wherein the plurality of land sections includes an outer shoulder land section on a tire axially outer side of the outer shoulder-main groove, and the plurality of lateral grooves includes a plurality of outer shoulder-lateral grooves formed in the outer shoulder land section such that the plurality of outer shoulder-lateral grooves includes a plurality of first outer shoulder-lateral grooves connected to the first outer middle-inclined grooves through the outer shoulder-main groove in smooth transition, respectively, and a plurality of second outer shoulder-lateral grooves extending from the outer tread edge in a tire axially inward direction and terminating within the outer shoulder land section.

11. The pneumatic tire according to claim 10, wherein the plurality of first outer middle-inclined grooves and the plurality of second outer middle-inclined grooves are formed such that each of the first and second outer middle-inclined grooves is crossing a center line evenly bisecting a width of the outer middle land section.

12. The pneumatic tire according to claim 10, wherein the plurality of first inner middle-inclined grooves is formed such that each of the first inner middle-inclined grooves is crossing a center line evenly bisecting a width of the inner middle land section, and the plurality of second inner middle-inclined grooves is formed such that each of the second inner middle-inclined grooves is not crossing the center line of the inner middle land section and terminating before reaching the center line.

13. The pneumatic tire according to claim 1, wherein the plurality of first outer middle-inclined grooves and the plurality of second outer middle-inclined grooves are formed such that each of the first and second outer middle-inclined grooves is crossing a center line evenly bisecting a width of the outer middle land section.

14. The pneumatic tire according to claim 13, wherein the plurality of first inner middle-inclined grooves is formed such that each of the first inner middle-inclined grooves is crossing a center line evenly bisecting a width of the inner middle land section, and the plurality of second inner middle-inclined grooves is formed such that each of the second inner middle-inclined grooves is not crossing the center line of the inner middle land section and terminating before reaching the center line.

15. The pneumatic tire according to claim 1, wherein the plurality of first inner middle-inclined grooves is formed such that each of the first inner middle-inclined grooves is crossing a center line evenly bisecting a width of the inner middle land section, and the plurality of second inner middle-inclined grooves is formed such that each of the second inner middle-inclined grooves is not crossing the center line of the inner middle land section and terminating before reaching the center line.

16. The pneumatic tire according to claim 15, wherein the plurality of first inner middle-inclined grooves is formed such that each of the first inner middle-inclined grooves has a tire axial length in a range of 0.6 to 0.85 times the width of the inner middle land section, and the plurality of second inner middle-inclined grooves is formed such that each of the second inner middle-inclined grooves has a tire axial length in a range of 0.35 to 0.50 times the tire axial length of the first inner middle-inclined grooves.

17. The pneumatic tire according to claim 1, wherein the plurality of first inner middle-inclined grooves is formed such that each of the first inner middle-inclined grooves has an angle in a range of 25 degrees to 70 degrees relative to a tire axial direction, and the plurality of second inner middle-inclined grooves is formed such that each of the second inner middle-inclined grooves has an angle in a range of 10 degrees to 50 degrees relative to the tire axial direction.

18. The pneumatic tire according to claim 1, wherein the plurality of first inner middle-inclined grooves is formed such that each of the first inner middle-inclined grooves has an angle in a range of 35 degrees to 60 degrees relative to a tire axial direction, and the plurality of second inner middle-inclined grooves is formed such that each of the second inner middle-inclined grooves has an angle in a range of 20 degrees to 40 degrees relative to the tire axial direction.

19. The pneumatic tire according to claim 1, wherein the plurality of inner middle-lateral grooves is formed such that each of the second inner middle-inclined grooves has the groove width in a range of 1.7 to 2.2 times the groove width of each of the first inner middle-inclined grooves.

20. The pneumatic tire according to claim 1, wherein the plurality of first inner middle-inclined grooves is formed such that each of the first inner middle-inclined grooves has a tire axial length in a range of 0.6 to 0.85 times the width of the inner middle land section and an angle in a range of 25 degrees to 70 degrees relative to a tire axial direction, the plurality of second inner middle-inclined grooves is formed such that each of the second inner middle-inclined grooves has a tire axial length in a range of 0.35 to 0.50 times the tire axial length of the first inner middle-inclined grooves and an angle in a range of 10 degrees to 50 degrees relative to the tire axial direction, and the plurality of inner middle-lateral grooves is formed such that each of the second inner middle-inclined grooves has the groove width in a range of 1.7 to 2.2 times the groove width of each of the first inner middle inclined grooves.

* * * * *

UNITED STATES PATENT AND TRADEMARK OFFICE
CERTIFICATE OF CORRECTION

PATENT NO. : 10,442,250 B2  
APPLICATION NO. : 14/940881  
DATED : October 15, 2019  
INVENTOR(S) : Tatsuya Sasaki Page 1 of 1

It is certified that error appears in the above-identified patent and that said Letters Patent is hereby corrected as shown below:

In the Claims

Column 14, Line 6, Claim 1, "telininating" should read --- terminating ---.

Signed and Sealed this  
Twenty-first Day of January, 2020

Andrei Iancu  
*Director of the United States Patent and Trademark Office*